United States Patent [19]

Schneider et al.

[11] 4,387,794
[45] Jun. 14, 1983

[54] SINGLE-SURFACE ELECTROMAGNETICALLY OPERATED CLUTCH/BRAKE UNIT

[75] Inventors: Rudolf Schneider; Siegfried Winkelmann, both of Tettnang, Fed. Rep. of Germany

[73] Assignee: Zahnradfabrik Friedrichshafen Aktiengesellschaft, Friedrichshafen, Fed. Rep. of Germany

[21] Appl. No.: 212,637

[22] Filed: Dec. 3, 1980

[30] Foreign Application Priority Data

Dec. 4, 1979 [DE] Fed. Rep. of Germany ....... 2948728

[51] Int. Cl.³ ........................................... F16D 67/06
[52] U.S. Cl. ................. 192/18 B; 192/12 D; 192/84 C; 403/370
[58] Field of Search ............... 192/12 D, 18 B, 84 C, 192/84 AB; 403/370; 66/56; 139/1 E

[56] References Cited

U.S. PATENT DOCUMENTS

| 3,426,875 | 2/1969 | Sturmer | 192/84 C |
| 3,581,855 | 6/1971 | Taeffner | 192/18 B |
| 3,777,864 | 12/1973 | Marti | 192/18 B |
| 3,805,849 | 4/1974 | Steverlynck | 139/1 E |
| 3,945,476 | 3/1976 | Jong | 192/12 D |
| 4,025,213 | 5/1977 | Schafer et al. | 403/370 |
| 4,172,985 | 10/1979 | Meier | 192/18 B X |
| 4,190,141 | 2/1980 | Bennett et al. | 192/84 C |

FOREIGN PATENT DOCUMENTS 6949530 12/1969 Fed. Rep. of Germany.

OTHER PUBLICATIONS

Siemans AG, Katalog KB, Teil 8 (part 8), May 1978, (2 pp.).

*Primary Examiner*—Rodney H. Bonck
*Attorney, Agent, or Firm*—Karl F. Ross; Herbert Dubno

[57] ABSTRACT

An electromagnetic single-surface clutch/brake combination, especially for textile machinery, in which a rotor assembly is locked to the shaft end encloses the magnetic body carrying the coils so that the latter can be secured to the housing flange when the unit, as delivered, is mounted on the shaft. The rotor assembly and the magnetic body are bridged by a bearing.

6 Claims, 1 Drawing Figure

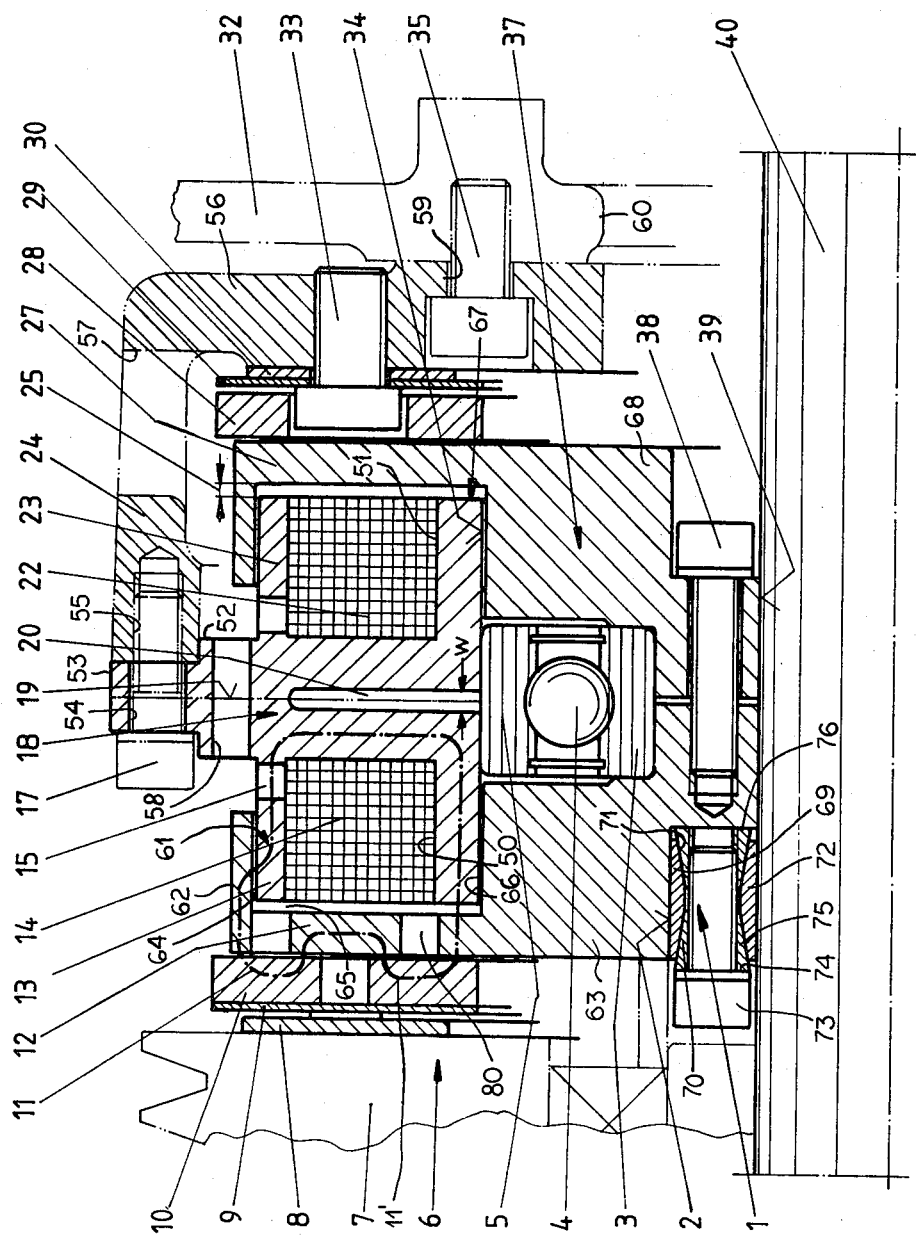

SINGLE-SURFACE ELECTROMAGNETICALLY OPERATED CLUTCH/BRAKE UNIT

FIELD OF THE INVENTION

The present invention relates to an electromagnetically operated combination clutch and brake of the single-surface type and, more particularly, to a clutch/brake unit which is particularly effective for textile machine drives.

BACKGROUND OF THE INVENTION

For many applications it is desirable to provide a combination clutch and brake which, although a single unit, can be electromagnetically actuated to couple a driven element with a shaft or to brake rotation of the shaft.

Such drives are particularly effective in textile machinery and must be capable of transmitting or absorbing high torques, must be operable practically free from inertia, must be rapidly switchable, must have a relatively low moment of inertia when coupling the driven element to the shaft, and must occupy a minimum of space, while being easily mounted and replaced and having long life even under low maintenance conditions.

In addition, the units must be relatively strong and capable of being switched over rapidly from drive to brake modes without the sudden changes in direction and in a manner of torque transmission detrimentally affecting the mutual positioning of the critical elements or the mechanical stability of the structure.

It has already been proposed to provide a combination clutch and brake for the purposes described in textile machine applications and in general such units are made by assembling two electromagnetic units in a mirror symmetrical relationship, i.e. back to back so that one is effective as a clutch while the other is effective as a brake. Various combinations of electromagnetic devices have been used for this purpose (see *Siemens Catalogue* KB Part 8, 1978, page 10). This publication describes a system in which the magnetic body is juxtaposed with a magnetic disc on the brake side which is nonrotating and with an armature disc on the clutch side which is coupled to the driven member.

The two rotors are mounted upon the shaft and clamp the bearing between them.

The assembly has relatively large axial dimensions and mounting it can bring about binding of the bearings. Maintenance and dismounting are complex.

OBJECTS OF THE INVENTION

It is the principal object of the present invention to provide an improved brake and clutch unit for the aforedescribed purposes whereby the aforementioned disadvantages are avoided.

Another object of the invention is to provide a clutch/brake combination of extremely compact size, simplified connection to the shaft and of high mechanical stability which can be easily mounted, adjusted, maintained and dismounted.

SUMMARY OF THE INVENTION

These objects and others which will become apparent hereinafter are attained, in accordance with the present invention, in a combination clutch and brake assembly which comprises a pair of rotors in the form of a clutch disc and a brake disc which are axially interconnected to enclose the magnetic body which forms a single unit mounted directly upon the housing flange and carrying the magnetic coils which cooperate with the discs. According to the invention, the inner race of a ball bearing is locked in place between the two rotors while the outer race and the magnetic body are relatively axially displaceable (the internal bore of the latter being free from projections) although they radially abut.

The hub of the rotor groove is fixed to the shaft by wedge-locking means although it is not keyed or initially angularly or axially fixed to the shaft.

According to a feature of the invention, the magnet body comprises two mirror symmetrical halves which form a unit mounted directly on the housing.

The armature discs mounted on the housing and driven member, respectively, can be provided with means assuring a double flux passage through each disc and a fastening flange attached to the housing can overhang the unit for connection to the magnetic body. Advantageously a radial groove is formed in this magnetic body between the coils and extends outwardly substantial to the outer diameters of the coils. The rotor assembly encloses the magnetic body which is affixed as a single unit directly to the housing and can be supplied without rotor unit as a single module. The groove in the magnetic body limits the stray flux path and the possibility of fabricating the magnetic body as two mirror symmetrical halves greatly simplifies manufacture.

The provision of openings or magnetic inserts in the armature disc (see German Utility Model No. 69 49 530) to provide double flux paths as will be described below, has also been found to help to limit the radial dimension of the unit.

BRIEF DESCRIPTION OF THE DRAWING

The above and other objects, features and advantages of the present invention will become more readily apparent from the following description, reference being made to the accompanying drawing in which:

The sole FIGURE is an axial cross sectional view of one half of a single-surface electromagnetically operable clutch/brake unit, according to the invention, which can be operated and applied in accordance with the principles described in the aforementioned publications and is especially effective in the drive and braking of textile machine elements.

SPECIFIC DESCRIPTION

In the partial axial section shown in the drawing, which, because the parts are substantially of circular configuration, is the mirror image of the portion not illustrated on the opposite side of the shaft, the clutch/brake combination 6 comprises a mirror symmetrical magnet body 18, whose symmetry plane is shown at 19 and which can be assembled, if desired, for right and left hand halves or pole portions 23 and 13 by any conventional means or formed unitarily from these two halves.

In the event the body 18 is formed from two halves which are joined together, the junction plane can correspond to the plane of symmetry 19.

In the region of this plane a radially extending, inwardly open annular groove 20 is formed, the groove 20 reaching outwardly substantially to the outer diameters of a pair of annular magnetic coils 14 and 22 respectively received in axially open annular recesses 50 and 51 in the respective halves 13 and 23 of the body 18. The groove 20 limits transfer of stray flux between the halves or pole portions.

The magnetic body 18 is formed with a central flange 52, the outer rim 53 of which is provided with axial bores 54 traversed by screws 17 which are threaded into bores 55 of a fastening flange 24 of a housing which will be described in greater detail below. It suffices, at this point, to note that the housing 56 is formed with radially open windows or passages 57 through which cooling air can pass.

The flange 52 is provided with an axial bore 58 which, together with bores 15 communicating with the interiors of the recesses 50 and 51, serve to pass the leads or conductors running to the coils.

The housing 56 formed with the flange 24 is connected, in turn, by bolts 35 traversing angularly equispaced bores 59 connecting this housing to the main machine frame or housing 32 which has an opening 60 passing the shaft 40.

Two rotors, namely a clutch disc 12 and a brake disc 27, flank and enclose the body 18. To this end, the clutch disc 12 comprises an axially open annular recess 61 defined between an axially extending flange 62 and the body or hub 63 of this disc, the left half 13 of the body 18 being received in this recess 61 so that narrow air gasps 64, 65 and 66 are defined between the clutch disc 12 and the body 18. The axial width w of the groove 20 is greater than the thickness of these air gaps.

Similarly the brake disc 27 has an annular recess 67 which receives the right hand half 23 of body 18.

Hub portions 63 and 68 of the two discs 12 and 27 are secured together by screws 38 to form a rotor group or assembly 37 which simultaneously axially locks the inner race 3 of a ball bearing 4 in a place.

The rotor group has an inner diameter 39 such that it is received with at least limited freedom to rotate and to be shifted axially relative to the shaft 40.

In the hub region of this rotor groove an inwardly open recess 2 is provided to accommodate a locking unit at which, when the rotor group is properly positioned, secures it to the shaft 40 against radial and axial movement relative to this shaft.

This locking device comprises an outer member 69 with oppositely inclined flanks 70 and 71 which is geometrically similar to the member 72 bearing upon the shaft 1. A screw 73 has a head 74 which acts against a cone 75 converging to the right, the screw being threaded into an oppositely converging cone 76. Thus, when the screw is tightened, the cones 75 and 76 are drawn together to wedge members 69 and 72 apart.

The ball bearing 4 has an outer ring 5 which is freely shiftable along the inner diameter 34 of the annular magnetic body 18 to preclude axial binding.

A brake armature disc 28 is connected in the conventional manner by a membrane spring 29 and a fastening screw 33 via a washer 30 to the housing portion 56 so that this disc 28 cannot rotate but can move axially within the limits defined by the membrane spring 29.

Similarly, a clutch armature disc 10 is connected by a membrane spring 9 and a fastening disc 8 and similar bolts not shown to the V-pulley 7 which is connected in turn to the driven element of the machine.

The air gap 65 between the axially turned ends of the magnet body 18 and the confronting wall of the rotor halves 12 and 27 has a width 25 which is greater than the air gaps 64 and 66. The armature discs and the rotors are provided with openings, e.g. as shown at 80, or with nonmagnetic inserts to establish a double pass of the flux as shown by dot-dash lines for the clutch through the armature disc. One such pass is shown at 11 and another at 11'.

The unit shown in the drawing is generally supplied in three modules, namely two modules each comprising an armature disc with the associated membrane springs, fastening disc and valves, and a larger module comprising the rotor assembly 37 together with the magnetic body 18 received therein and, of course the locking element 1.

For mounting, the armature disc assembly 28, 29, 30 is first applied and thereafter the rotor group with the magnetic body mounted on the shaft 40 and the magnet body is secured in place by bolts 17. The magnet body is then positioned in the rotor to establish the appropriate air gap width and the locking device 69-76 is tightened. The second armature disc module is then secured in place.

The unit has been found to be simple, reliable, strong and capable of being readily mounted, adjusted and positioned in manner which prevents binding of the bearings.

I claim:

1. An electromagnetically operable clutch and brake device for braking rotation of a shaft relative to a housing and coupling said shaft to a driven element, said device comprising:
   an annular magnetic body having
      an outer flange for attachment to said housing,
      a pair of pole-forming portions inwardly of said flange and having opposite axially open recesses,
      a pair of respective annular coils received in said recesses, and
      an inner surface defining the inner diameter of said body;
   a rotor assembly receiving said body and comprising
      a clutch disc juxtaposed with said element, a brake disc juxtaposed with said housing,
      means fastening said discs axially together, each of said discs reaching around and enclosing a respective one of said pole portions, said assembly being received on said shaft with freedom of axial and angular displacement, and
      a roller bearing having an inner race clamped between said discs and an outer race radially abutting said surface but axially shiftable relative thereto;
   respective armatures between said housing and said brake disc and between said element and said clutch disc; and
   means for locking said assembly to said shaft.

2. The device defined in claim 1 wherein the last mentioned means includes a tightenable wedge arrangement braced against said assembly and said shaft.

3. The device defined in claim 1 wherein said body comprises two mirror symmetrical halves connected jointly to said housing.

4. The device defined in claim 1 wherein said armatures are provided with means effecting double flux paths from the respective pole portions therethrough.

5. The device defined in claim 1 wherein said housing is provided with a fastening flange reaching around said assembly and secured to said flange of said body substantially in a plane of symmetry thereof perpendicular to said shaft.

6. The device defined in claim 1, claim 2, claim 3, claim 4 or claim 5 wherein said body is formed with an inwardly open annular radial groove extending outwardly substantially to the outer diameter of said coils.

* * * * *